US012316024B2

(12) United States Patent
Yang et al.

(10) Patent No.: US 12,316,024 B2
(45) Date of Patent: May 27, 2025

(54) ANTENNA AND METASURFACE STRUCTURE FOR ANTENNA

(71) Applicant: City University of Hong Kong, Kowloon (HK)

(72) Inventors: Chenfeng Yang, Kowloon (HK); Gengbo Wu, Kowloon (HK); Ka Fai Chan, Kowloon (HK); Chi Hou Chan, Kowloon (HK)

(73) Assignee: City University of Hong Kong, Kowloon (HK)

( * ) Notice: Subject to any disclaimer, the term of this patent is extended or adjusted under 35 U.S.C. 154(b) by 276 days.

(21) Appl. No.: 18/089,720

(22) Filed: Dec. 28, 2022

(65) Prior Publication Data

US 2024/0222876 A1 Jul. 4, 2024

(51) Int. Cl.

| | |
|---|---|
| ***H01Q 3/46*** | (2006.01) |
| ***H01Q 3/14*** | (2006.01) |
| ***H01Q 15/00*** | (2006.01) |
| ***H01Q 19/06*** | (2006.01) |

(52) U.S. Cl.

CPC ................. *H01Q 3/46* (2013.01); *H01Q 3/14* (2013.01); *H01Q 15/0086* (2013.01); *H01Q 19/06* (2013.01)

(58) Field of Classification Search

CPC .. H01Q 3/02; H01Q 3/12; H01Q 3/14; H01Q 3/26; H01Q 3/2658; H01Q 3/46; H01Q 15/0006; H01Q 15/0013; H01Q 15/002; H01Q 15/0026; H01Q 15/0053; H01Q 15/006; H01Q 15/0066; H01Q 15/0073; H01Q 15/008; H01Q 15/0086; H01Q 15/0093; H01Q 15/24; H01Q 15/242; H01Q 19/06; H01Q 19/062; H01Q 19/067; H01Q 19/08; H01Q 19/09; H01Q 25/001; H01Q 25/002

See application file for complete search history.

(56) References Cited

U.S. PATENT DOCUMENTS

| | | | |
|---|---|---|---|
| 8,068,053 B1 | 11/2011 | Stutzke et al. |
| 10,411,343 B2 | 9/2019 | Driscoll et al. |
| 2011/0188120 A1 | 8/2011 | Tabirian et al. |
| 2021/0384638 A1 | 12/2021 | Chan et al. |

FOREIGN PATENT DOCUMENTS

| | | | |
|---|---|---|---|
| CN | 213071385 U | * | 4/2021 |
| CN | 114069256 A | * | 2/2022 |
| CN | 112636005 | | 3/2022 |
| CN | 114824834 | | 10/2022 |

* cited by examiner

*Primary Examiner* — Robert Karacsony

(74) *Attorney, Agent, or Firm* — Renner, Kenner, Greive, Bobak, Taylor & Weber

(57) ABSTRACT

An antenna includes, at least, a metasurface structure assembly and a feed. The feed is coupled with the metasurface structure assembly and is operable to provide a first type of electromagnetic radiation with a first radiation property to the metasurface structure assembly. The metasurface structure assembly is operable to receive the first type of electromagnetic radiation from the feed and to convert the first type of electromagnetic radiation into a second type of electromagnetic radiation and then back to the first type of electromagnetic radiation with a second radiation property for radiation from the metasurface structure assembly. The first radiation property and the second radiation property are different.

30 Claims, 12 Drawing Sheets

ANTENNA AND METASURFACE STRUCTURE FOR ANTENNA

TECHNICAL FIELD

The invention relates to an antenna and metasurface structure(s) for an antenna.

BACKGROUND

Electromagnetic waves in the millimeter wave (mmWave) band can be used for various imaging and other applications. One problem associated with these waves in the mmWave band is that they may suffer from high atmospheric attenuation loss.

To compensate for the attenuation loss, a high gain antenna such as a reflectarray antenna can be used. Problematically, however, the feed or feed source of existing reflectarray antenna is usually placed far away from the reflectarray aperture to enhance the antenna gain and aperture efficiency. This makes the antenna relatively bulky and hence difficult to integrate into some relatively small devices.

SUMMARY OF THE INVENTION

In a first aspect, there is provided an antenna comprising a metasurface structure assembly and a feed. The feed is coupled with the metasurface structure assembly. The feed is operable to provide a first type of electromagnetic radiation to the metasurface structure assembly. The metasurface structure assembly is operable to receive the first type of electromagnetic radiation with a first radiation property from the feed, convert the first type of electromagnetic radiation into a second type of electromagnetic radiation and then back to the first type of electromagnetic radiation with a second radiation property for radiation from the metasurface structure assembly. The first radiation property is different from the second radiation property. The metasurface structure assembly may radiate the first type of electromagnetic radiation with the second radiation property in a direction away from the feed.

The first radiation property may relate to one or more of gain, phase, radiation pattern, etc., and the second radiation property may relate to corresponding one or more of gain, phase, radiation pattern, etc. For example, the first radiation property includes a first radiation pattern with a first general (e.g., average) direction of travel and the radiation property includes a second radiation pattern with a second general direction of travel different from the first general (e.g., average) direction of travel. For example, the first radiation pattern is less directional than the second radiation pattern. For example, the first radiation property includes a first gain and the second radiation property includes a second gain larger than the first gain. The difference(s) in the first and second radiation properties may be due to, e.g., different phase or phase distribution.

In some implementations, the antenna may be arranged to operate in transmission mode (to provide electromagnetic radiation), or receive mode (to receive electromagnetic radiation), or both.

Optionally, the first type of electromagnetic radiation comprises one of right-hand circularly polarized electromagnetic wave and left-hand circularly polarized electromagnetic wave. Optionally, the second type of electromagnetic radiation comprises another one of right-hand circularly polarized electromagnetic wave and left-hand circularly polarized electromagnetic wave. In one example, the first type of electromagnetic radiation comprises a right-hand circularly polarized electromagnetic wave and the second type of electromagnetic radiation comprises a left-hand circularly polarized electromagnetic wave.

Optionally, the feed is integrated with the metasurface structure assembly.

Optionally, the metasurface structure assembly comprises, at least, a first metasurface structure having first and second sides (e.g., opposite sides) and a second metasurface structure having first and second sides (e.g., opposite sides). Optionally, the first metasurface structure and the second metasurface structure are spaced apart such that at least part of the second side of the first metasurface structure is in facing relation with at least part of the first side of the second metasurface structure to define a space therebetween. In one example, the first metasurface structure and the second metasurface structure are spaced apart such that the entire second side of the first metasurface structure is in facing relation with the entire first side of the second metasurface structure to define a space therebetween. Optionally, the feed is coupled with the second metasurface structure.

In some examples, the first metasurface structure and the second metasurface structure have substantially the same shape and/or size in plan view. In some examples, the first metasurface structure and the second metasurface structure have different shapes and/or sizes in plan view.

Optionally, the feed is in facing relation with the second side of the first metasurface structure.

Optionally, the first metasurface structure comprises a receiver-transmitter metasurface structure, which could receive and/or transmit specific electromagnetic radiation.

Optionally, the second metasurface structure comprises a reflective metasurface structure, which could reflect specific electromagnetic radiation.

Optionally, the feed is operable to transmit or radiate the first type of electromagnetic radiation with the first radiation property to the second side of the first metasurface structure. Optionally, the first metasurface structure is operable to reflect the first type of electromagnetic radiation with the first radiation property incident on its second side to the first side of second metasurface structure. Optionally, the second metasurface structure is operable to convert the first type of electromagnetic radiation incident on its first side into the second type of electromagnetic radiation for reflection from its first side to the second side of the first metasurface structure. Optionally, the first metasurface structure is further operable to receive the second type of electromagnetic radiation incident on its second side and convert it to the first type of electromagnetic radiation with the second radiation property for radiation from its first side.

In one example operation of the antenna, the feed transmits or radiates the first type of electromagnetic radiation with the first radiation property to the second side of the first metasurface structure. The first metasurface structure then reflects the first type of electromagnetic radiation with the first radiation property back towards the first side of the second metasurface structure. The first side of the second metasurface structure receives the reflected first type of electromagnetic radiation, converts it into a second type of electromagnetic radiation, and reflects the second type of electromagnetic radiation to the second side of the first metasurface structure. The first metasurface structure receives the second type of electromagnetic radiation reflected from the second metasurface structure, then processes it to become the first type of electromagnetic radiation, and then radiates the first type of electromagnetic radiation with the second radiation property from the first side of the first metasurface structure.

Optionally, the first metasurface structure is arranged to reflect the first type of electromagnetic radiation incident on its second side in such a way that an angle of reflection of the first type of electromagnetic radiation is different from an angle of incident of the first type of electromagnetic radiation.

Optionally, the first metasurface structure is arranged to reflect the first type of electromagnetic radiation incident on its second side in such a way that an angle of reflection of the first type of electromagnetic radiation is smaller than an angle of incident of the first type of electromagnetic radiation.

Optionally, the first metasurface structure and the second metasurface structure are arranged generally in parallel.

Optionally, the first metasurface structure comprises: a substrate assembly with a first surface on the first side of the first metasurface structure and a second surface on the second side of the first metasurface structure, a ground plane coupled with the substrate assembly, and a plurality of conductive elements coupled with the substrate assembly.

Optionally, the substrate assembly comprises or consists of a first substrate layer and a second substrate layer. Optionally, the ground plane is arranged between the first and second substrate layers.

Optionally, each of the plurality of conductive elements respectively comprises a first conductive patch arranged on the first surface, a second conductive patch arranged on the second surface, and a connector arranged in the substrate assembly and electrically connecting the first and second conductive patches. The connector may include a via, a probe, etc. The ground plane may define an opening through which the connector can pass, preferably without directly contacting the ground plane.

Optionally, the plurality of conductive elements are arranged such that the first metasurface structure can provide multiple (e.g., 2) resonances.

Optionally, the first conductive patch and the second conductive patch of the same conductive element have substantially the same shape, form, and/or size.

In some examples, in plan view the first conductive patch and the second conductive patch of the same conductive element are generally aligned and/or occupy generally the same footprint. In some examples, in plan view the first conductive patch and the second conductive patch of the same conductive element are unaligned and/or occupy different footprints.

Optionally, at least some of the first conductive patches of the plurality of conductive elements have different orientations. Optionally, at least some of the second conductive patches of the plurality of conductive elements have different orientations.

Optionally, in plan view at least one, some, or all of the first conductive patches each has a generally E-shaped structure. Optionally, the generally E-shaped structure comprises or consists of: a head portion, a first arm portion extending away from the head portion and elongating along a first direction, a second arm portion extending away from the head portion and elongating along the first direction, and a third arm portion extending away from the head portion and elongating along the first direction. The second arm portion is arranged between the first and third arm portions. The generally E-shaped structure further comprises a bridge portion spaced apart from the head portion and connecting the first arm portion with the second arm portion.

Optionally, in plan view at least one, some, or all of the second conductive patches each has a generally E-shaped structure. Optionally, the generally E-shaped structure comprises or consists of: a head portion, a first arm portion extending away from the head portion and elongating along a first direction, a second arm portion extending away from the head portion and elongating along the first direction, and a third arm portion extending away from the head portion and elongating along the first direction. The second arm portion is arranged between the first and third arm portions. The generally E-shaped structure further comprises a bridge portion spaced apart from the head portion and connecting the first arm portion with the second arm portion.

Optionally, the second metasurface structure comprises: a substrate with a first surface on the first side of the second metasurface structure and a second surface on the second side of the second metasurface structure, a ground plane coupled with the substrate, and a plurality of conductive patches arranged on the first surface of the substrate. The substrate may include one or more substrate layers.

Optionally, the ground plane is arranged on the second surface of the substrate.

Optionally, in plan view, at least one, some, or all of the conductive patches has a generally maltese-cross-shaped structure.

Optionally, the generally maltese-cross-shaped structure comprises: a central portion and four arm portions angularly spaced apart (e.g., evenly) and each extending away from the central portion. The four arm portions may have substantially the same shape and/or size in plan view.

Optionally, at least part of the feed is arranged in or on the second metasurface structure.

Optionally, the second metasurface structure defines an opening, and at least part of the feed is received in the opening.

Optionally, in plan view the feed is arranged at a center or a central portion of the second metasurface structure.

Optionally, the feed comprises a waveguide, e.g., an open-ended waveguide.

Optionally, the feed comprises an oscillator, e.g., an integrated circuit based oscillator.

Optionally, the antenna further comprises a movement mechanism arranged to move at least one of the first metasurface structure and the second metasurface structure for beam steering.

Optionally, the movement mechanism comprises a rotation mechanism arranged to rotate at least one of the first metasurface structure and the second metasurface structure. The rotation mechanism may rotate the first metasurface structure and the second metasurface structure about the same rotation axis. The rotation mechanism may rotate the first metasurface structure and the second metasurface structure about different axes (preferably parallel). Optionally, the rotation mechanism is operable to cause relative rotation between the first metasurface structure and the second metasurface structure. Optionally, the rotation mechanism is operable to rotate the first metasurface structure and the second metasurface structure in the same direction (both clockwise to both anti-clockwise). Optionally, the rotation mechanism is operable to rotate the first metasurface structure and the second metasurface structure in opposite directions (one clockwise and one anti-clockwise).

Optionally, the antenna is arranged for operation at a mmWave frequency or at least part of mmWave frequency band (about 30 GHz to about 300 GHz).

In a second aspect, there is provided a system comprising the antenna of the first aspect. The system may be, e.g., a communication system (e.g., radar), an imaging system (e.g., confocal microscope), etc.

In a third aspect, there is provided a first metasurface structure of the metasurface structure assembly of the antenna of the first aspect.

In a fourth aspect, there is provided a second metasurface structure of the metasurface structure assembly of the antenna of the first aspect.

In a fifth aspect, there is provided a metasurface structure for the metasurface structure assembly of the antenna of the first aspect. The metasurface structure comprises: a substrate assembly with a first surface and a second surface opposite the first surface, a ground plane coupled with the substrate assembly, and a plurality of conductive elements coupled with the substrate assembly. The metasurface structure has opposite first and second sides. The metasurface structure is operable to reflect a first type of electromagnetic radiation received at its second side. The metasurface structure is operable to receive a second type of electromagnetic radiation received at its second side, and convert it to the first type of electromagnetic radiation for radiation from its first side. The first type of electromagnetic radiation received at the second side of the metasurface structure may be different from the first type of electromagnetic radiation radiated from the first side of the metasurface structure, e.g., in terms of one or more of radiation pattern, general direction of travel, gain, etc. Optionally, the first type of electromagnetic radiation comprises one of right-hand circularly polarized electromagnetic wave and left-hand circularly polarized electromagnetic wave.

Optionally, the second type of electromagnetic radiation comprises another one of right-hand circularly polarized electromagnetic wave and left-hand circularly polarized electromagnetic wave. In one example, the first type of electromagnetic radiation comprises a right-hand circularly polarized electromagnetic wave and the second type of electromagnetic radiation comprises a left-hand circularly polarized electromagnetic wave.

Optionally, the substrate assembly comprises or consists of a first substrate layer and a second substrate layer. Optionally, the ground plane is arranged between the first and second substrate layers.

Optionally, each of the plurality of conductive elements respectively comprises a first conductive patch arranged on the first surface, a second conductive patch arranged on the second surface, and a connector arranged in the substrate assembly and electrically connecting the first and second conductive patches. The connector may include a via, a probe, etc. The ground plane may define an opening through which the connector can pass, preferably without directly contacting the ground plane.

Optionally, the first conductive patch and the second conductive patch of the same conductive element have substantially the same shape, form, and/or size.

In some examples, in plan view the first conductive patch and the second conductive patch of the same conductive element are generally aligned and/or occupy generally the same footprint. In some examples, in plan view the first conductive patch and the second conductive patch of the same conductive element are unaligned and/or occupy different footprints.

Optionally, at least some of the first conductive patches of the plurality of conductive elements have different orientations. Optionally, at least some of the second conductive patches of the plurality of conductive elements have different orientations.

Optionally, in plan view at least one, some, or all of the first conductive patches each has a generally E-shaped structure. Optionally, the generally E-shaped structure comprises or consists of: a head portion, a first arm portion extending away from the head portion and elongating along a first direction, a second arm portion extending away from the head portion and elongating along the first direction, and a third arm portion extending away from the head portion and elongating along the first direction. The second arm portion is arranged between the first and third arm portions. The generally E-shaped structure further comprises a bridge portion spaced apart from the head portion and connecting the first arm portion with the second arm portion.

Optionally, in plan view at least one, some, or all of the second conductive patches each has a generally E-shaped structure. Optionally, the generally E-shaped structure comprises or consists of: a head portion, a first arm portion extending away from the head portion and elongating along a first direction, a second arm portion extending away from the head portion and elongating along the first direction, and a third arm portion extending away from the head portion and elongating along the first direction. The second arm portion is arranged between the first and third arm portions. The generally E-shaped structure further comprises a bridge portion spaced apart from the head portion and connecting the first arm portion with the second arm portion.

In a sixth aspect, there is provided a metasurface structure for the metasurface structure assembly of the antenna of the first aspect. The metasurface structure comprises a substrate with a first surface and a second surface opposite the first surface, a ground plane coupled with the substrate, and a plurality of conductive patches arranged on the first surface of the substrate. The substrate may include one or more substrate layers. The metasurface structure has opposite first and second sides. The first side of the metasurface structure is operable to receive a first type of electromagnetic radiation and convert it into a second type of electromagnetic radiation for reflection. Optionally, the first type of electromagnetic radiation comprises one of right-hand circularly polarized electromagnetic wave and left-hand circularly polarized electromagnetic wave and the second type of electromagnetic radiation comprises another one of right-hand circularly polarized electromagnetic wave and left-hand circularly polarized electromagnetic wave. In one example, the first type of electromagnetic radiation comprises a right-hand circularly polarized electromagnetic wave and the second type of electromagnetic radiation comprises a left-hand circularly polarized electromagnetic wave.

Optionally, the ground plane is arranged on the second surface of the substrate.

Optionally, in plan view, at least one, some, or all of the conductive patches has a generally maltese-cross-shaped structure.

Optionally, the generally maltese-cross-shaped structure comprises: a central portion and four arm portions angularly spaced apart (e.g., evenly) and each extending away from the central portion. The four arm portions may have substantially the same shape and/or size in plan view.

Optionally, the metasurface structure defines an opening for receiving at least part of the feed of the antenna.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are used, depending on context, to account for manufacture tolerance, degradation, trend, tendency, imperfect practical condition(s), etc. In one example, when a value is modified by terms of degree, such as "about", such expression may include the stated value ±15%, ±10%, ±5%, ±2%, or ±1%.

Unless otherwise specified, the terms "connected", "coupled", "mounted" or the like, are intended to encompass both direct and indirect connection, coupling, mounting, etc.

BRIEF DESCRIPTION OF THE DRAWINGS

Embodiments of the invention will now be described, by way of example, with reference to the accompanying drawings in which.

DETAILED DESCRIPTION

Figure 12:
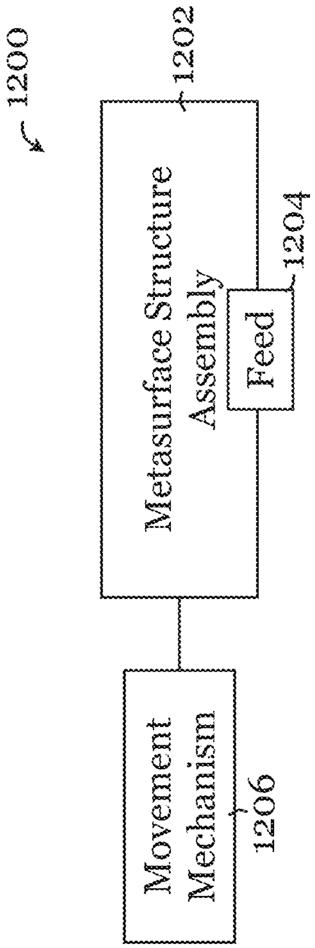
FIG. 12 is a functional block diagram of an antenna in some embodiments of the invention.

FIG. 12 shows an antenna 1200 in some embodiments of the invention. The antenna 1200 generally includes a metasurface structure assembly 1202 and a feed 1204 coupled with the metasurface structure assembly 1202. The feed 1204 is operable to provide, among other things, a first type of electromagnetic radiation with a first radiation property to the metasurface structure assembly 1202. The metasurface structure assembly 1202 is operable to receive the first type of electromagnetic radiation from the feed 1204, convert the first type of electromagnetic radiation into a second type of electromagnetic radiation (i.e., modify one or more properties of the first type of electromagnetic radiation) and then back to the first type of electromagnetic radiation with a second radiation property for radiation from the metasurface structure assembly. The first and second radiation properties are different. The metasurface structure assembly may radiate the first type of electromagnetic radiation with the second radiation property in any direction, e.g., a direction away from the feed 1204. In this arrangement the antenna 1200 is operating in transmission mode. In some examples, the antenna 1200 is arranged to operate only in transmission mode. In some examples, the antenna 1200 is arranged to operate, e.g., selectively, in transmission and receive modes. In some implementations, the antenna 1200 is configured such that the first type of electromagnetic radiation and the second type of electromagnetic radiation include different circularly polarized electromagnetic waves. For example, the first type of electromagnetic radiation include one of right-hand circularly polarized electromagnetic wave and left-hand circularly polarized electromagnetic wave, and the second type of electromagnetic radiation comprises another one of right-hand circularly polarized electromagnetic wave and left-hand circularly polarized electromagnetic wave. The metasurface structure assembly 1202 may be configured to process a left-hand circularly polarized electromagnetic wave with a first radiation property provided by the feed to become a corresponding left-hand circularly polarized electromagnetic wave with a second radiation property different from the first radiation property (i.e., by changing the phase or phase distribution of the electromagnetic wave). Or, the metasurface structure assembly 1202 may be configured to process a right-hand circularly polarized electromagnetic wave with a first radiation property provided by the feed to become a corresponding right-hand circularly polarized electromagnetic wave with a second radiation property different from the first radiation property (i.e., by changing the phase or phase distribution of the electromagnetic wave). The feed 1204 is disposed close to the metasurface structure assembly 1202. In some implementations, the feed 1204 is integrated with (e.g., directly arranged on or in) the metasurface structure assembly 1202. In some implementations, the metasurface structure assembly 1202 includes multiple (two or more) spaced-apart metasurface structures.

In some implementations, the antenna 1200 also includes a movement mechanism 1206 arranged to move one or more parts of the metasurface structure assembly 1202 during operation of the antenna 1200 to perform beam steering, e.g., to steer the first type of electromagnetic radiation radiated by the metasurface structure assembly 1202. The movement mechanism may be a motorized mechanism.

In some implementations, the antenna 1200 is suitable for operation at a millimeter wave (mmWave) frequency or at at least part of the mmWave band (e.g., about 30 GHz to about 300 GHz). The antenna 1200 can be used or incorporated in various systems such as but not limited to a communication system (e.g., radar), an imaging system (e.g., confocal microscope), etc.

Some example implementations of the antenna 1200 is now described. It should be noted that the antenna 1200 can be implemented differently from these example implementations.

Figure 1A:
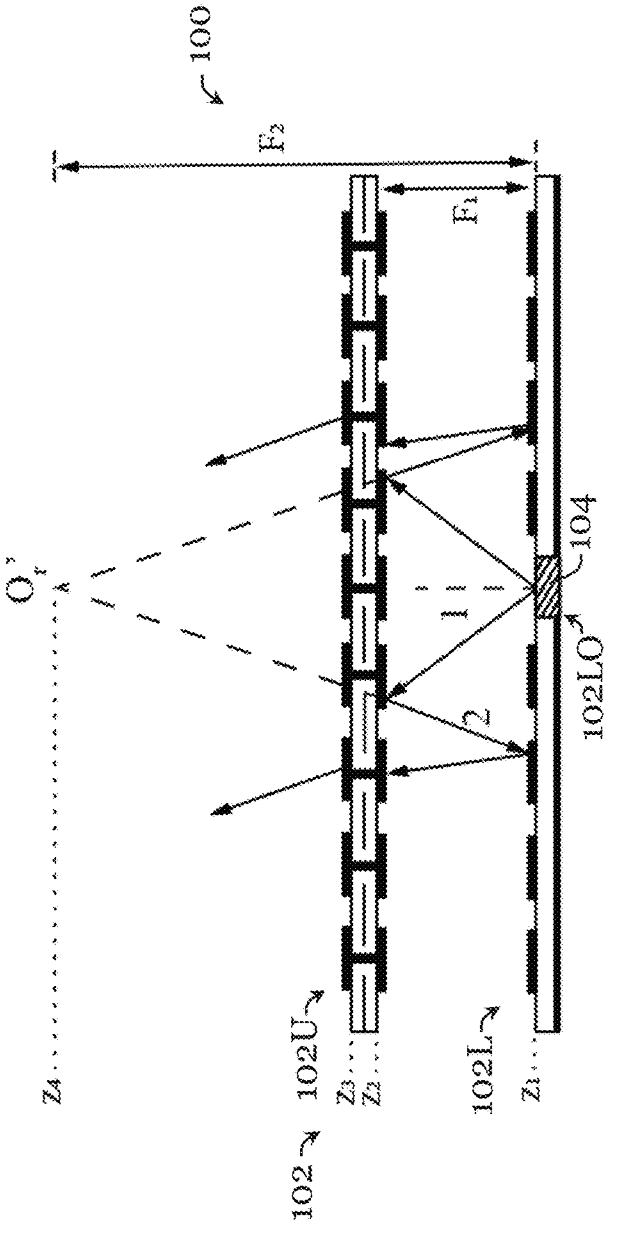
FIG. 1A is a schematic diagram showing a sectional side view of an antenna in one embodiment of the invention and various wave propagation paths in one example operation.
Figure 1B:
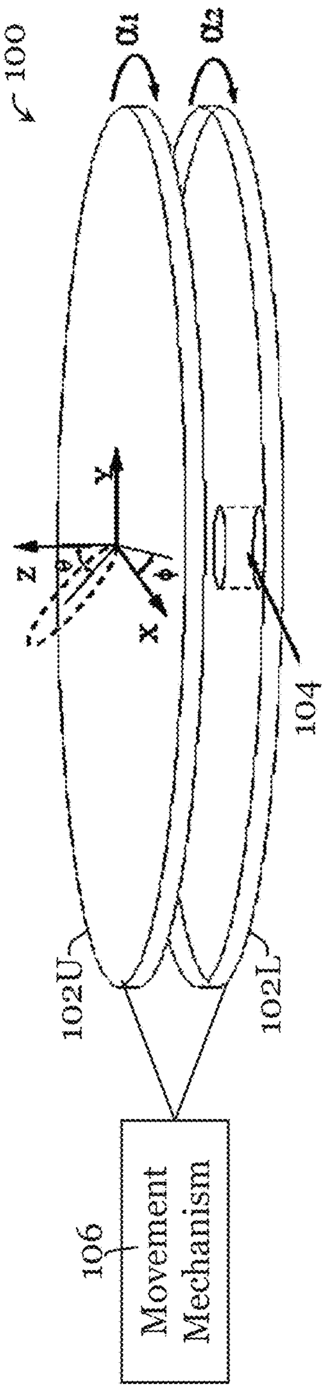
FIG. 1B is a schematic diagram showing the antenna of FIG. 1A operably connected with a movement mechanism for beam steering in one embodiment of the invention.

FIGS. 1A and 1B show an antenna 100 in one embodiment of the invention. The antenna 100 in this embodiment can be considered as a low-profile folded reflectarray metasurface system with beam steering ability.

The antenna 100 includes a metasurface structure assembly 102 and a feed 104 coupled with the metasurface structure assembly 102. The feed 104 is operable to provide, among other things, a first type of electromagnetic radiation with a first radiation property (e.g., pattern) to the metasurface structure assembly 102. The metasurface structure assembly 102 is operable to receive the first type of electromagnetic radiation (with the first radiation property (e.g., pattern)) from the feed 104 and to convert the first type of electromagnetic radiation into a second type of electromagnetic radiation (i.e., modify one or more properties of the first type of electromagnetic radiation) and then back to the first type of electromagnetic radiation with a second radiation property (e.g., pattern), different from the first, for radiation from the metasurface structure assembly 102. The metasurface structure assembly 102 may radiate the first type of electromagnetic radiation in any direction, e.g., a direction away from the feed 104. In this embodiment, the first type of electromagnetic radiation includes a right-hand circularly polarized electromagnetic wave and the second type of electromagnetic radiation includes a left-hand circularly polarized electromagnetic wave. The first radiation property and the second radiation property may include different radiation patterns, different general directions of radiation, different gains, different phases or phase distributions, etc.

In this embodiment, the metasurface structure assembly 102 includes an upper metasurface structure 102U and a lower metasurface structure 102L, in the form of generally rounded discs arranged generally in parallel. The upper metasurface structure 102U is a receiver-transmitter (R/T) metasurface structure with an upper side and a lower side and which can receive and transmit, e.g., selectively, at least some electromagnetic radiation. The lower metasurface structure 102L is a reflective metasurface structure with an upper side and a lower side and which can reflect at least some electromagnetic radiation. The upper and lower metasurface structures 102U, 102L are spaced apart such that the lower side of the upper metasurface structure 102U is in facing relation with the upper of the lower metasurface structure 102L to define a space or cavity therebetween. In this embodiment, the upper and lower metasurface structures 102U, 102L have generally the same shape and size in plan view (when viewed from the top).

In this embodiment, the feed 104 is integrated with the lower metasurface structure 102L. Specifically, the lower metasurface structure 102L defines a central opening 102LO and the feed 104 is received in the opening 102LO. The feed 104 is in facing relation with the lower side of the upper metasurface structure 102U. Although not illustrated, the feed may extend beyond the lower side of the lower metasurface structure 102L or coupled with other component(s) at or near the lower side of the lower metasurface structure 102L. In this embodiment, the feed 104 is a waveguide, in particular an open-ended waveguide.

In this embodiment, as will be described in greater detail below, the upper metasurface structure 102U is operable to (i) receive left-hand circularly polarized electromagnetic wave and convert the received left-hand circularly polarized electromagnetic wave into right-hand circularly polarized electromagnetic wave for radiation or transmission and (ii) reflect right-hand circularly polarized electromagnetic wave, whereas the lower metasurface structure 102L is operable to convert incident right-hand circularly polarized electromagnetic wave into left-hand circularly polarized electromagnetic wave for reflection.

In this embodiment, the feed 104 is operable to transmit or radiate the right-hand circularly polarized electromagnetic wave with a first radiation property (radiation pattern, general direction of radiation, gain, phase or phase distribution, etc.) to the lower side of the upper metasurface structure 102U. The upper metasurface structure 102U is operable to reflect the right-hand circularly polarized electromagnetic wave (e.g., from the feed 104) incident on its lower side back to the upper side of the lower metasurface structure 102L. In this example, the upper metasurface structure 102U is arranged to reflect the right-hand circularly polarized electromagnetic wave incident on its lower side in such a way that an angle of reflection of the right-hand circularly polarized electromagnetic wave is different from (e.g., smaller than) an angle of incident of the right-hand circularly polarized electromagnetic wave. The lower metasurface structure 102L is operable to convert the right-hand circularly polarized electromagnetic wave (e.g., from the upper metasurface structure 102U) incident on its upper side into the left-hand circularly polarized electromagnetic wave for reflection from its upper side to the lower side of the upper metasurface structure 102U. The upper metasurface structure 102U is further operable to receive the left-hand circularly polarized electromagnetic wave (e.g., from the lower metasurface structure 102L) incident on its lower side, and convert it to a right-hand circularly polarized electromagnetic wave with a second radiation property (radiation pattern, general direction of radiation, gain, phase or phase distribution, etc.), different from the first, for radiation from its upper side. The left-hand circularly polarized electromagnetic wave received at the lower side of the upper metasurface structure 102U and the right-hand circularly polarized electromagnetic wave radiated from the upper side of the upper metasurface structure 102U may have one or more further different radiation properties (e.g., phase, directivity, gain, etc.), (apart from the difference in polarizations)).

As shown in FIG. 1B, the antenna 100 also includes a movement mechanism 106 arranged to move one or both of the upper and lower metasurface structures 102U, 102L, for beam steering. In this embodiment, the movement mechanism 106 includes a rotation mechanism arranged to rotate one or both of the upper and lower metasurface structures

102U, 102L about the same rotation axis (e.g., in a manner similar to the operation of a Risley prism). The rotation mechanism may cause relative rotation between the upper and lower metasurface structures 102U, 102L. The movement mechanism may be a motorized mechanism. In some embodiments, the movement mechanism 106 may additional or alternatively include a translation mechanism to move one or both of the upper and lower metasurface structures 102U, 102L to adjust their separation and/or alignment.

FIG. 1A illustrates an example operation. As shown in FIG. 1A, a right-hand circularly polarized electromagnetic wave is radiated from the feed 104 (open-ended waveguide) along trace 1. The wave in trace 1 reaches the lower side of the upper metasurface structure 102U. The lower part of the upper metasurface structure 102U is arranged to create a virtual focus point at Or. In FIG. 1A, from bottom to top, the z-coordinates of the reflective element of the lower metasurface structure 102L, the lower conductive patch of the conductive element of the upper metasurface structure 102U, the upper conductive patch of the conductive element of the upper metasurface structure 102U, and a virtual focus point $O_r$' are defined as $z_1$, $z_2$, $z_3$, and $z_4$, respectively. The Cartesian coordinates of the open-ended waveguide feed 104 and the virtual focus point $O_r$' can be expressed as (0, 0, $z_1$) and (0, 0, $z_4$) respectively. At the same (x, y) location, the Cartesian coordinates of the reflective element of the lower metasurface structure 102L, the lower conductive patch of the conductive element of the upper metasurface structure 102U, and the upper conductive patch of the conductive element of the upper metasurface structure 102U can be expressed as (x, y, $z_1$), (x, y, $z_2$), and (x, y, $z_3$), respectively. Therefore, the phase distribution of the lower part of the upper metasurface structure 102U, $\varphi_L$ can be calculated as follows:

$$\begin{aligned}\varphi_L(x, y) &= k_0\sqrt{x^2 + y^2 + (z_2 - z_1)^2} - k_0\sqrt{x^2 + y^2 + (z_2 - z_4)^2} \\ &= k_0\sqrt{x^2 + y^2 + F_1^2} - k_0\sqrt{x^2 + y^2 + (F_1 - F_2)^2}\end{aligned} \quad (1)$$

where $k_0$ is the free-space wavenumber at the center frequency of operation. After reflected by the upper metasurface structure 102U, the right-hand circularly polarized electromagnetic wave propagates along trace 2 and reaches the lower metasurface structure 102L. For the lower metasurface structure 102L, the feed 104 can be regarded as located at $O_r$'. The lower metasurface structure 102L compensates for the spatial phase delay from $O_r$' and introduces a phase gradient to deflect the generated plane wave direction. The desired phase distribution can be expressed as follows:

$$\begin{aligned}\varphi_{Re}(x, y) &= k_0\sqrt{x^2 + y^2 + (z_1 - z_4)^2} + p_2x \\ &= k_0\sqrt{x^2 + y^2 + F_2^2} + p_2x\end{aligned} \quad (2)$$

where $p_2$ is the phase gradient introduced by the lower metasurface structure 102L. In addition, the right-hand circularly polarized electromagnetic wave is converted into a left-hand circularly polarized electromagnetic wave by the lower metasurface structure 102L. When the left-hand circularly polarized electromagnetic wave reflected from the lower metasurface structure 102L reaches the upper metasurface structure 102U, it is received at the lower side of the upper metasurface structure 102U, converted into right-hand circularly polarized electromagnetic wave, and then radiated at the upper side of the upper metasurface structure 102U. The same phase gradient is introduced by the upper side of the upper metasurface structure 102U for the beam steering function, which can be expressed as follows:

$$\varphi_U(x, y) = p_1x \quad (3)$$

where $p_r$ is the phase gradient introduced to the transmitting part of the upper metasurface structure 102U.

Conventional spatially-fed reflectarray places the source at $O_r$' to ensure high gain and avoid a large incidence angle. The antenna 100 of this embodiment reduces the spatially-fed distance by trapping the right-hand circularly polarized electromagnetic wave from the feed 104 between the upper and lower metasurface structures 102U, 102L.

In this embodiment, beam steering function is achieved through the transformation of the phase gradients. After the phase compensation, the phase distributions across the upper aperture (at height $z_3$, assume thickness of the conductive elements are negligible) of metasurface structure 102U and the upper aperture (at height $z_1$, assume thickness of the conductive elements are negligible) of metasurface structure 102L become generally uniform except for the phase gradients.

As shown in FIG. 1B, when the upper metasurface structure 102U and the lower metasurface structure 102L are in-plane rotated clockwise with the angles of $\alpha_1$ and $\alpha_2$ about the axis of rotation (in this example central axis), respectively, their phase shifts transformation expressed in the original coordinates becomes:

$$\Delta\varphi_1(x, y) = p_1x\cos\alpha_1 + p_1y\sin\alpha_1 \quad (4)$$

$$\Delta\varphi_2(x, y) = p_2x\cos\alpha_2 + p_2y\sin\alpha_2 \quad (5)$$

where $\Delta\varphi(x,y)$ and $\Delta\varphi_2(x,y)$ are the output phase of the upper metasurface structure 102U element and the lower metasurface structure 102L element, respectively. The total phase distribution across the upper aperture of the upper metasurface structure 102U can be expressed as summation of the two output phases and a uniform reference phase or:

$$\begin{aligned}\varphi_t &= \Delta\varphi_1 + \Delta\varphi_2 + \varphi_r \\ &= (p_1\cos\alpha_1 + p_2\cos\alpha_2)x + (p_1\sin\alpha_1 + p_2\sin\alpha_2)y + \varphi_r\end{aligned} \quad (6)$$

Equation (6) indicates that a new phase distribution is formed for radiation by rotating the upper and lower metasurface structures. The generated beam angle of the new phase distribution can be derived by:

$$\begin{aligned}\theta &= \arcsin\left\{\frac{\sqrt{(p_1\cos\alpha_1 + p_2\cos\alpha_2)^2 + (p_1\sin\alpha_1 + p_2\sin\alpha_2)^2}}{k_0}\right\} \\ &= \arcsin\left\{\frac{\sqrt{p_1^2 + p_2^2 + 2p_2p_2\cos(\alpha_1 - \alpha_2)}}{k_0}\right\}\end{aligned} \quad (7)$$

-continued $$\phi = \arctan\frac{p_1\sin\alpha_1 + p_2\sin\alpha_2}{p_1\cos\alpha_1 + p_2\cos\alpha_2} \quad (8)$$

For the case $p_1=p_2=p$, equations (7) and (8) can be further simplified as:

$$\theta = \arcsin\left\{\frac{2p\left|\cos\left(\frac{\alpha_1-\alpha_2}{2}\right)\right|}{k_0}\right\} \quad (9)$$

$$\phi = \begin{cases} \frac{(\alpha_1+\alpha_2)}{2}, & |\alpha_1-\alpha_2| > \pi \\ \frac{(\alpha_1+\alpha_2)}{2} + \pi, & |\alpha_1-\alpha_2| \le \pi \end{cases} \quad (10)$$

It can be observed from equations (9) and (10) that the scan range of the antenna 100 is $0° \le \theta \le \arcsin(2p/k_0)$, $0° \le \phi \le 360°$.

Referring back to FIG. 1A, the wave propagation direction along trace 2 is determined by the reflection phase of the upper metasurface structure 102U. Moreover, $O_r$ can be obtained by extrapolating trace 2. Therefore, the profile suppression ratio ($F_2/F_1$) can be controlled by properly designing or modifying the reflection phase of the lower part of the upper metasurface structure 102U.

Figure 2A:
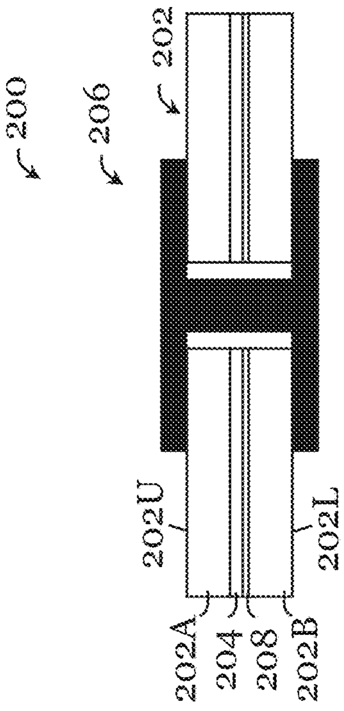
FIG. 2A is a schematic diagram showing a sectional side view of a part of the upper metasurface structure of the antenna of FIG. 1A in one embodiment of the invention.
Figure 2C:
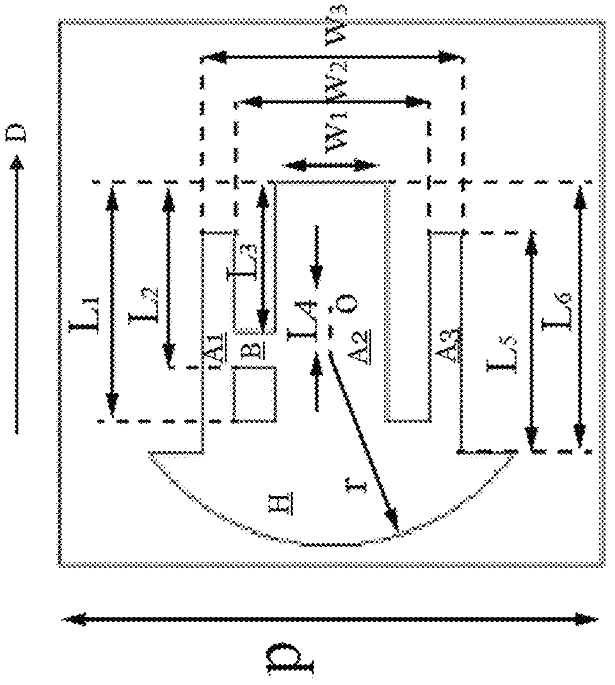
FIG. 2C is a schematic diagram showing a top view of the part of FIG. 2A.
Figure 2B:
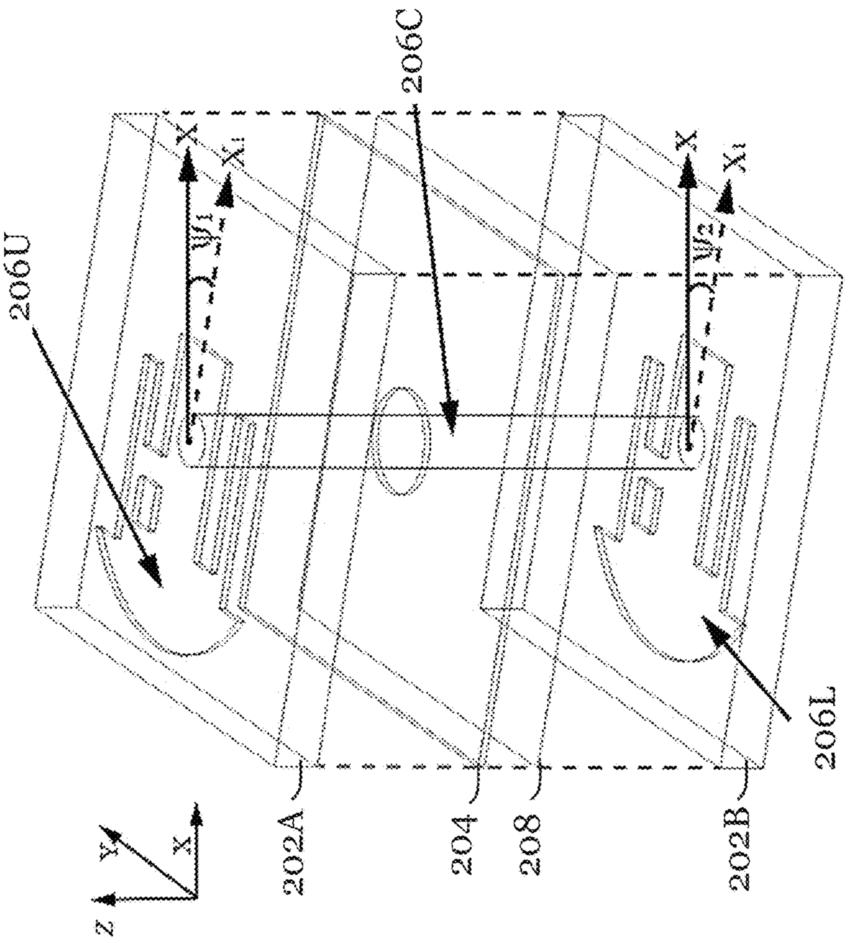
FIG. 2B is a schematic diagram showing an exploded view of the part of FIG. 2A.

FIGS. 2A to 2C show a part 200 of the upper metasurface structure 102U of the antenna 100 of FIG. 1A in one embodiment of the invention. The upper metasurface structure 102U includes, or is formed by, multiple ones of these parts (which may be of different sizes).

As shown in FIGS. 2A to 2C, the part 200 includes a substrate assembly 202 with an upper surface 202U and a lower surface 202L, a ground plane 204 coupled with the substrate assembly, and a conductive element 206 coupled with the substrate assembly. In this embodiment, the substrate assembly 202 includes two substrate layers 202A and 202B. In this example, each of the two layers 202A, 202B is a 0.508 mm thick Rogers RT/duroid 5880 substrate. The ground plane 204 is arranged between the two substrate layers 202A, 202B. A bonding film 208 is arranged between the ground plane 204 and the substrate layer 202B. In this example, the bonding film is a RO4450F film arranged to bond the two substrate layers 202A, 202B. In this embodiment, the conductive element 206 includes an upper conductive patch 206U arranged on the upper surface 202U of the substrate assembly 202, a lower conductive patch 206L arranged on the lower surface 202L of the substrate assembly 202, and a connector 206C arranged in the substrate assembly and electrically connecting the upper and lower conductive patches 206U, 206L. In this example, the connector 206C is a metallic via, shaped like a probe, which extends generally perpendicularly in the substrate assembly (through the layers 202A, 202B, and the ground plane 204) with reference to the patches 206U, 206L. As best shown in FIG. 2B, the ground plane 204 defines a generally circular opening through which the connector 206C can pass without contacting the ground plane.

In this example the upper conductive patch 206U is arranged for transmitting or radiating right-hand circularly polarized electromagnetic wave whereas the lower conductive patch 206L is arranged for receiving left-hand circularly polarized electromagnetic wave and reflecting right-hand circularly polarized electromagnetic wave. The conductive element 206 can convert received left-hand circularly polarized electromagnetic wave into right-hand circularly polarized electromagnetic wave. In this example, the upper and lower conductive patches have generally the same shape and size and are generally aligned and occupy generally the same footprint in plan view.

In this example, the upper and lower conductive patches 206U, 206L each has a generally E-shaped structure. FIG. 2C best shows the generally E-shaped structure of the upper conductive patch 206U (which in this example is generally the same as the generally E-shaped structure of the lower conductive patch 206L). The generally E-shaped structure of the patches is arranged to provide two resonances for achieving a wide bandwidth.

As shown in FIG. 2C, the generally E-shaped structure of the patch 206U includes multiple connected or integrally formed portions: a head portion H, a first arm portion A1 extending away from the head portion H and elongating along direction D, a second arm portion A2 extending away from the head portion H and elongating along direction D, and a third arm portion A3 extending away from the head portion H and elongating along direction D. The second arm portion A2 is a center arm portion arranged between the first and third arm portions A1, A3. The generally E-shaped structure further includes a bridge portion B spaced apart from the head portion H and connecting the first arm portion A1 with the second arm portion A2. This creates different current paths for circular polarized (CP) wave generation. In this example, the head portion H has a generally semi-circular or generally circular segment shape for impedance matching. The head portion H can thus be considered as an impedance matching portion.

Table I lists the values of parameters in the part 200 in this example.

TABLE I

Values of parameters of part 200 in this embodiment

| P | r | $L_1$ | $L_2$ | $L_3$ | $L_4$ |
|---|---|---|---|---|---|
| 2.2 mm | 0.92 mm | 0.97 mm | 0.75 mm | 0.6 mm | 0.1 mm |

| $L_5$ | $L_6$ | $w_1$ | $w_2$ | $w_3$ |
|---|---|---|---|---|
| 0.9 mm | 1.1 mm | 0.45 mm | 0.79 mm | 1.05 mm |

In this embodiment, the upper metasurface structure 102U has multiple upper conductive patches and multiple lower conductive patches, and the reflection and transmission phases of the upper metasurface structure 102U are controlled by varying the orientations of the different conductive patches. In this example, if the incident wave is a right-hand circularly polarized electromagnetic wave, the upper metasurface structure 102U operates as a reflector to reflect it; if the incident wave is a left-hand circularly polarized electromagnetic wave, the upper metasurface structure 102U receives the wave and changes the transmission phase distribution (including converting it to right-hand circularly polarized electromagnetic wave) for high gain radiation.

Figure 3A:
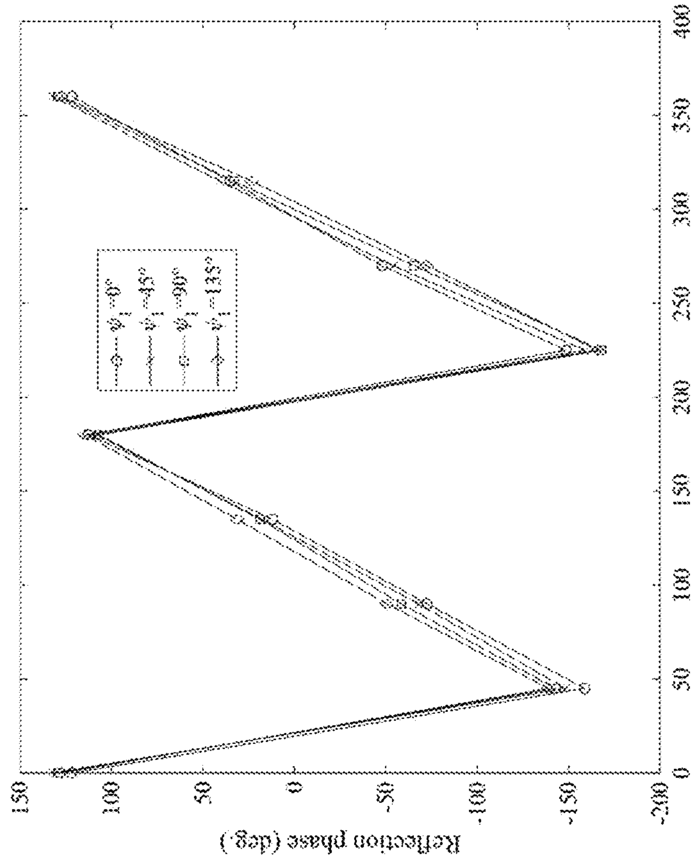
FIG. 3A is a graph showing simulated reflection phase of the part of FIG. 2A when a right-hand circularly polarized electromagnetic wave is incident on its lower surface.
Figure 3B:
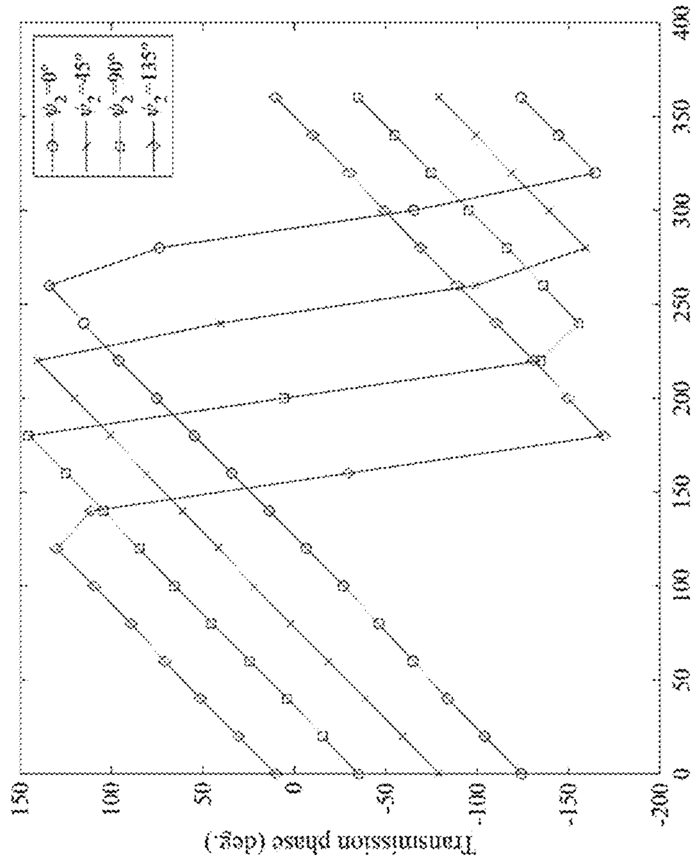
FIG. 3B is a graph showing simulated transmission phase of the part of FIG. 2A when a left-hand circularly polarized electromagnetic wave is incident on its lower surface.

FIG. 3A shows simulated reflection phase of the part 200 of FIG. 2A when a right-hand circularly polarized electromagnetic wave is incident on its lower surface whereas FIG. 3B shows simulated transmission phase of the part 200 of FIG. 2A when a left-hand circularly polarized electromagnetic wave is incident on its lower surface. From FIGS. 3A and 3B, it can be observed that the reflection phase is mostly or only controlled by the orientation of the lower conductive patches as the lower part of the upper metasurface structure 102U reflects most of the incident right-hand circularly polarized electromagnetic waves. For left-hand circularly polarized electromagnetic waves, both the upper and lower conductive patches are involved in the modulation of the transmission phase.

Figure 4A:
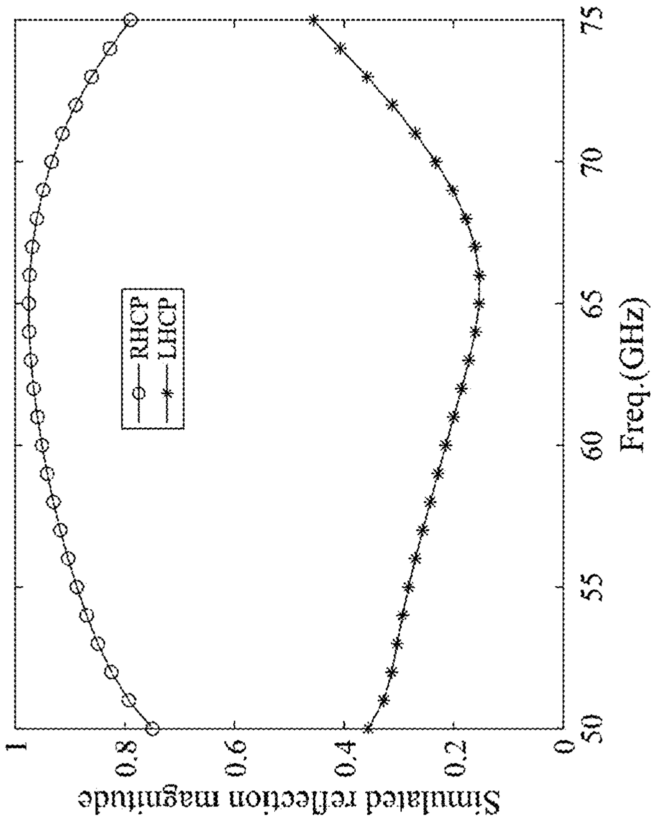
FIG. 4A is a graph showing simulated reflection magnitude of the part of FIG. 2A when a right-hand circularly polarized electromagnetic wave is incident on its lower surface.
Figure 4B:
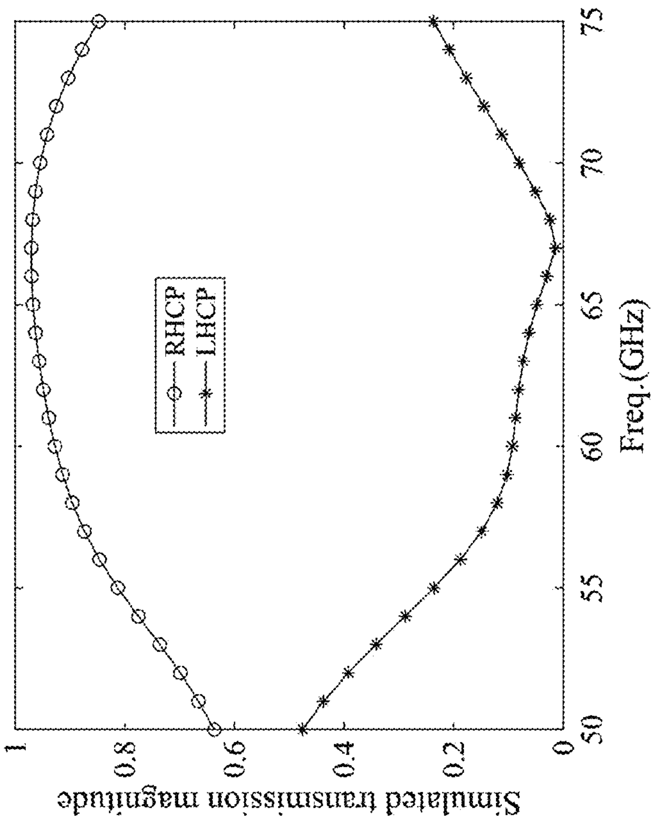
FIG. 4B is a graph showing simulated transmission magnitude of the part of FIG. 2A when a left-hand circularly polarized electromagnetic wave is incident on its lower surface.

FIG. 4A shows simulated reflection magnitude of the part 200 of FIG. 2A when a right-hand circularly polarized electromagnetic wave is incident on its lower surface whereas FIG. 4B shows simulated reflection magnitude of the part 200 of FIG. 2A when a left-hand circularly polarized electromagnetic wave is incident on its lower surface.

Figure 5A:
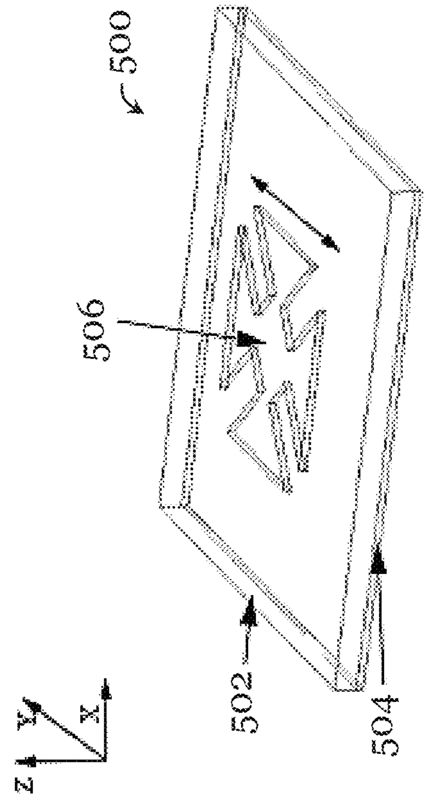
FIG. 5A is a schematic diagram showing a perspective view of a part of the lower metasurface structure of the antenna of FIG. 1A in one embodiment of the invention.
Figure 5B:
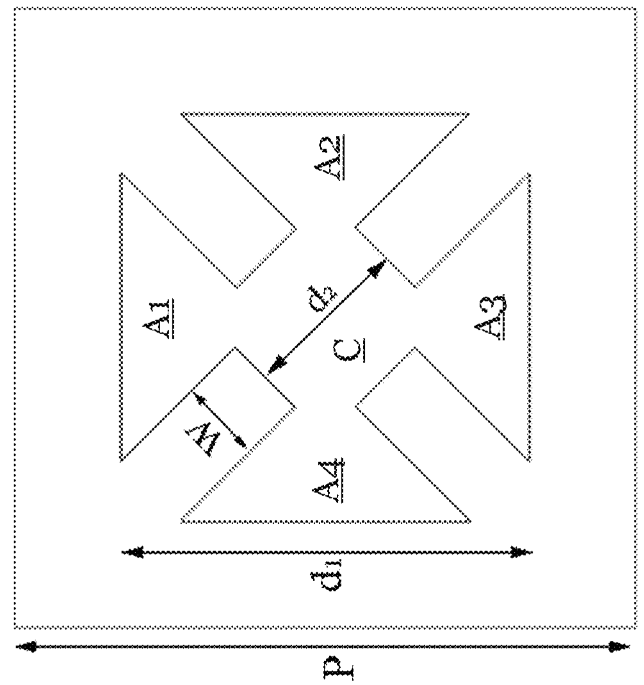
FIG. 5B is a schematic diagram showing a top view of the part of FIG. 5A.

FIGS. 5A and 5B illustrate a part 500 of the lower metasurface structure 102L of the antenna 100 of FIG. 1A in one embodiment of the invention. The lower metasurface structure 102L includes, or is formed by, multiple ones of these parts (which may be of different sizes).

As shown in FIG. 5A, the part 500 includes a substrate 502 (or substrate layer) with upper and lower surfaces, a ground plane 504 coupled to the lower surface of the substrate 502, and a conductive patch 506 arranged on the upper surface of the substrate 502. As illustrated in FIG. 1A, the conductive patch 506 is generally aligned with a corresponding conductive element (patch) in the upper metasurface structure 102U. The substrate 502 in this example is a 0.508 mm thick RT/duroid 5880 substrate. The ground plane 204 is arranged to enlarge or improve the phase tuning range and convert the circularly-polarized electromagnetic waves.

As best shown in FIG. 5B, in this example, the conductive patch 506 has a generally maltese-cross-shaped structure. The generally maltese-cross-shaped structure includes multiple connected or integrally formed portions: a central portion C (generally rectangular or squared in plan view) and four arm portions A1, A2, A3, A4 (generally trapezoidal in plan view) angularly spaced apart evenly and each extending away from the central portion C. The four arm portions A1, A2, A3, A4 in this example have substantially the same shape and size in plan view. The conductive patch 506 may be printed on the substrate 502. In this example, the conductive patch 506 is arranged to convert the incident right-hand circularly polarized electromagnetic wave into left-hand circularly polarized electromagnetic wave for reflection, to compensate for the spatial phase delay, and to provide a phase gradient.

Figure 6:
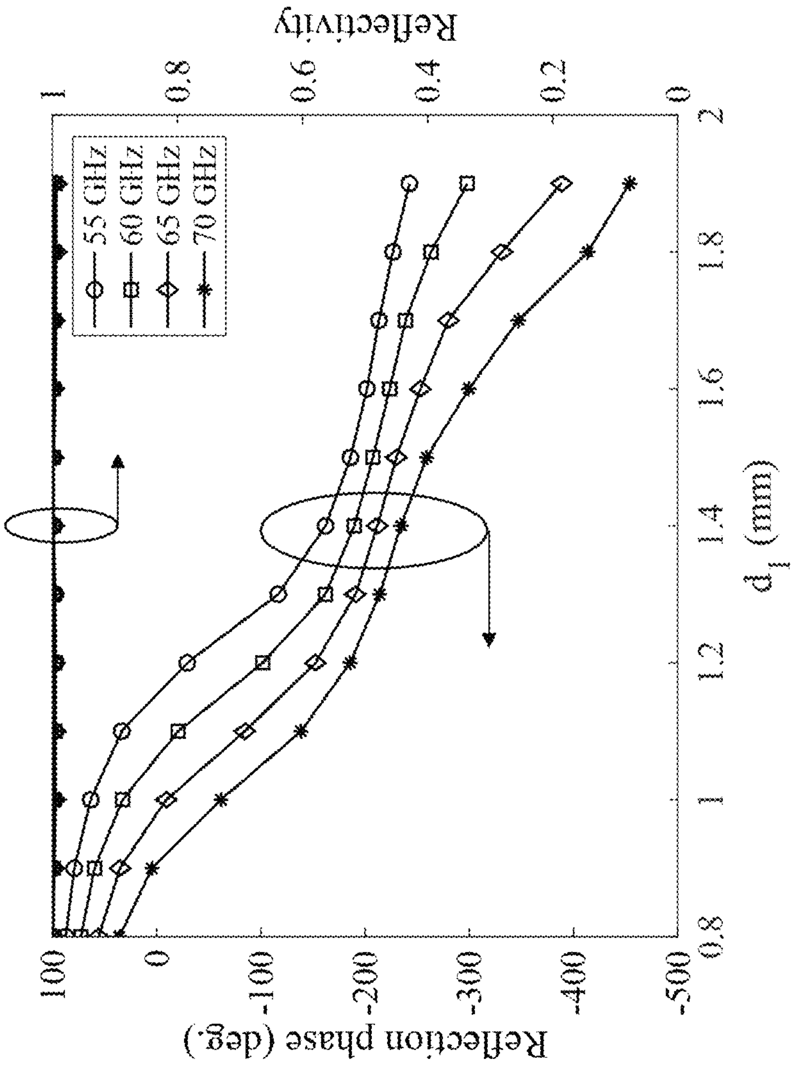
FIG. 6 is a graph showing simulated reflection phase and magnitude the part of FIG. 5A.

FIG. 6 shows simulated reflection phase and magnitude the part 500 of FIG. 5A. From FIG. 6, it can be observed that the reflection phase can fully cover 360° by tuning the element's size to change its resonant frequency with the reflectivity higher than 0.99 from 55 GHz to 70 GHz.

In one example, the profile suppression ratio ($F_2/F_1$) is set to 4, and the distance between the two metasurface $F_1$ is set to 9.4 mm. At the designated frequency of 60 GHz, the phase distributions are calculated based on equations (1), (2), and (3) with the maximum beam steering angle $\theta=40°$ and equal phase gradients $p_1=p_2=0.3214k_0$.

Figure 7B:
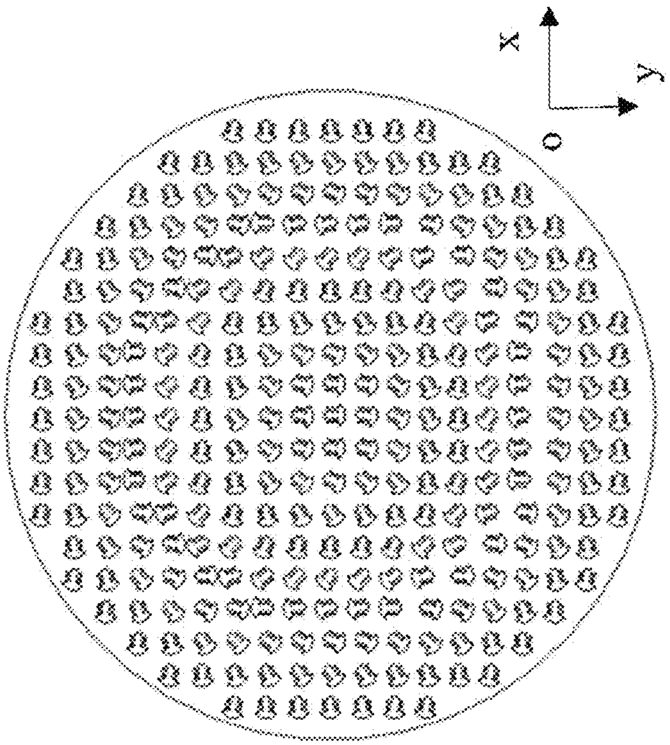
FIG. 7B is a schematic diagram showing a bottom view of the upper metasurface structure of the antenna of FIG. 1A in one embodiment of the invention.
Figure 7A:
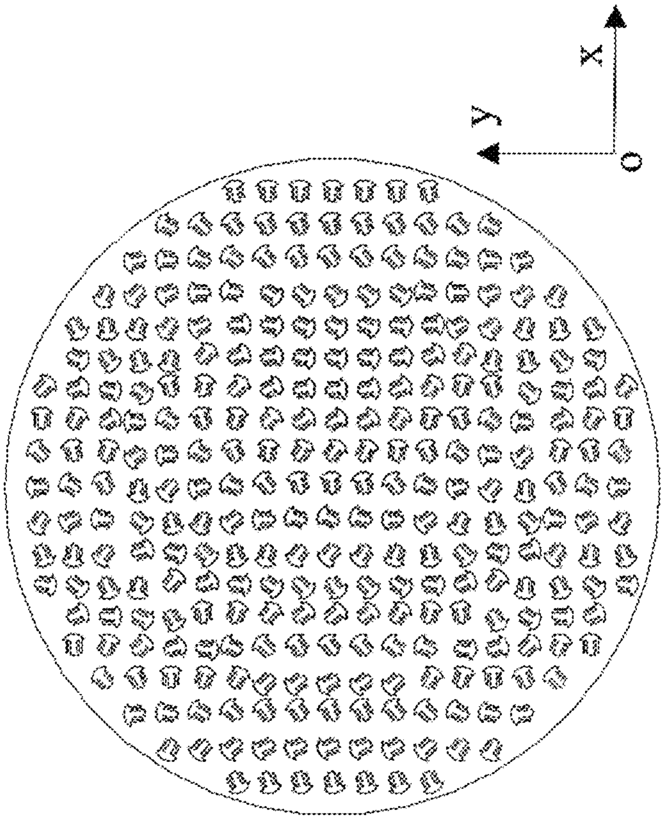
FIG. 7A is a schematic diagram showing a top view of the upper metasurface structure of the antenna of FIG. 1A in one embodiment of the invention.
Figure 8:
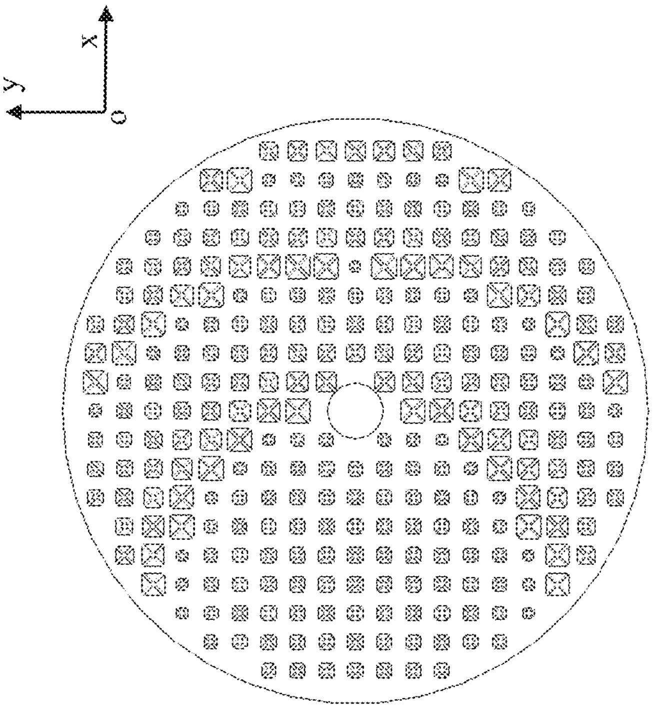
FIG. 8 is a schematic diagram showing a top view of the lower metasurface structure of the antenna of FIG. 1A in one embodiment of the invention.

FIGS. 7A and 7B show the upper and lower sides of the upper metasurface structure 102U of the antenna 100 of FIG. 1A whereas FIG. 8 shows the upper side of the lower metasurface structure 102L of the antenna 100 of FIG. 1A in this example (the aperture at the center of FIG. 8 corresponds to the location of the feed). As shown in FIGS. 7A and 7B, the upper metasurface structure 102U includes multiple ones of the parts 200 illustrated in FIGS. 2A to 2C, with at least some conductive elements (patches) arranged in different orientations. As shown in FIG. 8, the lower metasurface structure 102L includes multiple ones of the parts 500 illustrated in FIGS. 5A and 5B, with at least some conductive patch arranged in different orientations. In this example, each of the upper and lower metasurface structures 102U, 102L has 293 elements and has a diameter of 41.8 mm ($8.36\lambda_0$).

A full wave simulation is performed using CST Microwave Studio to verify the effectiveness of the above design.

Figure 9A:
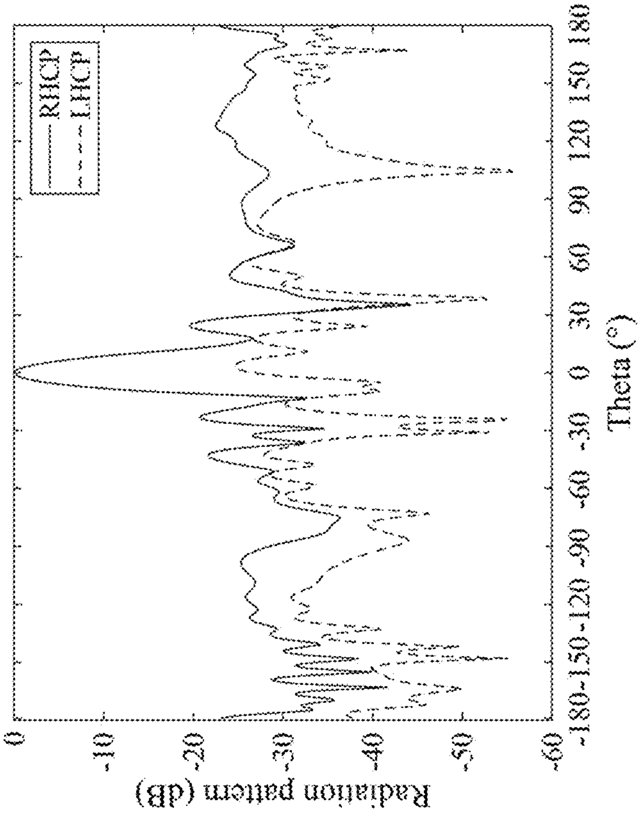
FIG. 9A is a plot showing simulated normalized radiation pattern (in xoz-plane) of the antenna of FIG. 1A in one embodiment of the invention.
Figure 9B:
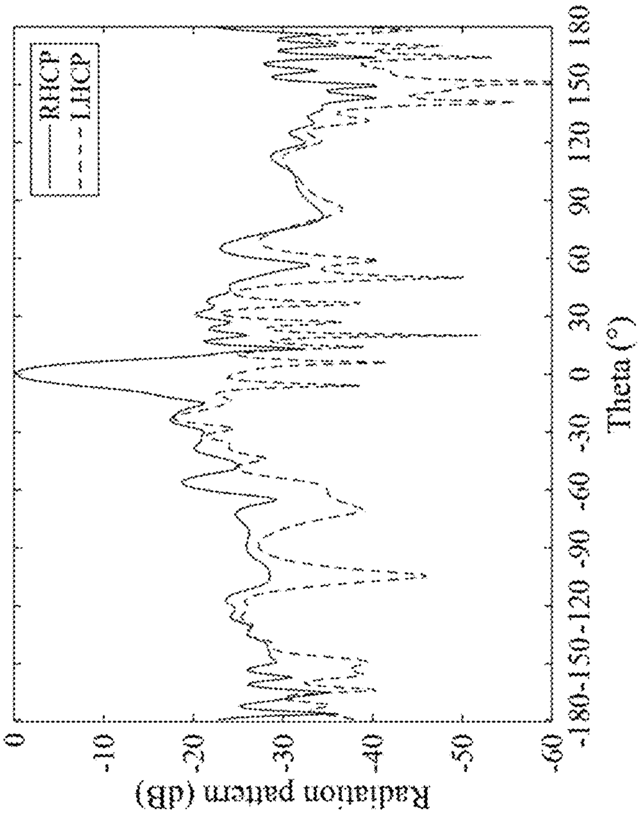
FIG. 9B is a plot showing simulated normalized radiation pattern (in yoz-plane) of the antenna of FIG. 1A in one embodiment of the invention.

FIGS. 9A and 9B show the simulated normalized radiation pattern (in xoz-plane and yoz-plane respectively) of the antenna 100 of FIG. 1A (constructed based on FIGS. 7A-8).

Figure 10B:
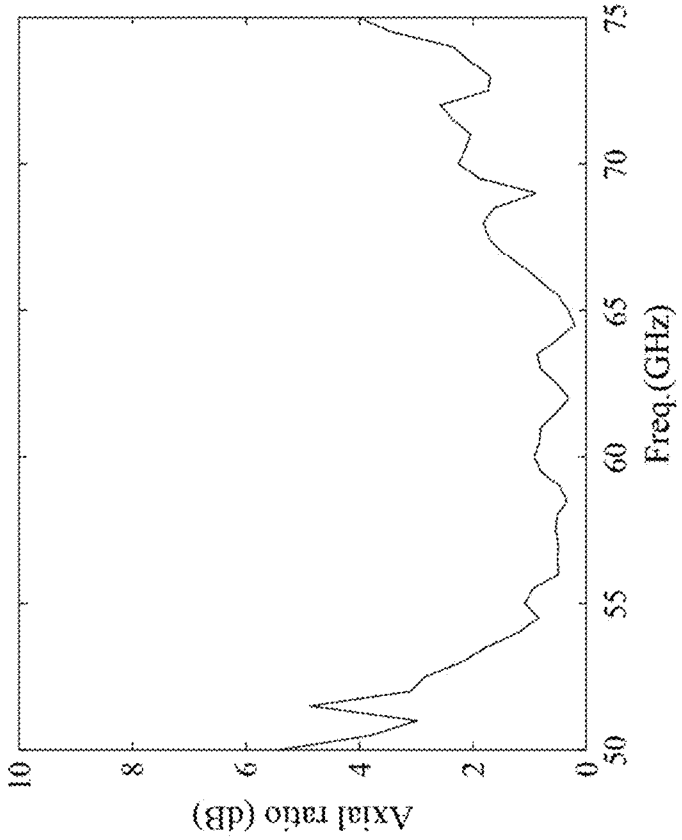
FIG. 10B is a graph showing axial ratio of the antenna of FIG. 1A at different frequencies in one embodiment of the invention.
Figure 10A:
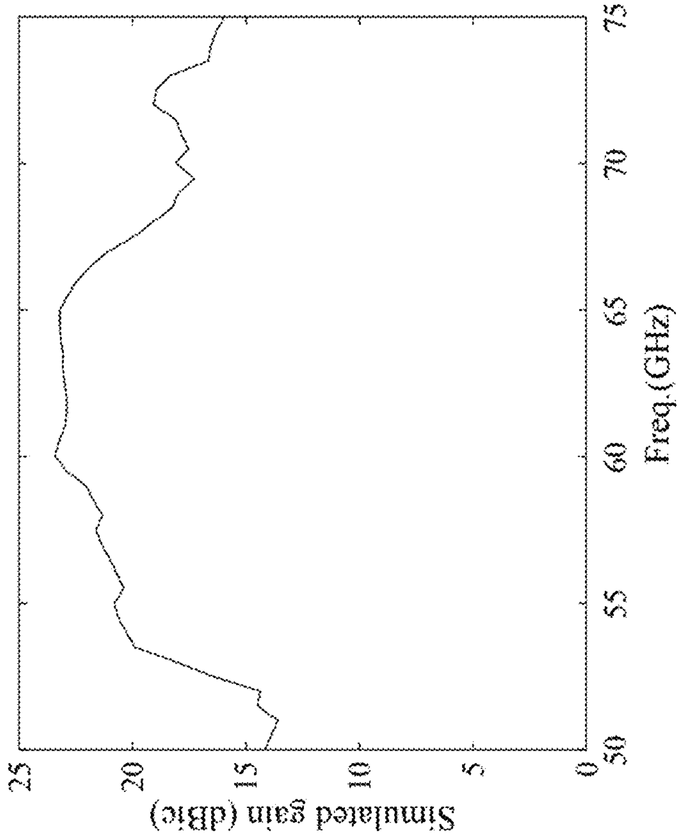
FIG. 10A is a graph showing simulated gain of the antenna of FIG. 1A at different frequencies in one embodiment of the invention.

FIGS. 10A and 10B show simulated gain and axial ratio of the antenna 100 of FIG. 1A (constructed based on FIGS. 7A-8) at different frequencies. As shown in FIGS. 10A and 10B, the realized gain is simulated as 23.4 dBic, which corresponds to an aperture efficiency of 31.7%. In the tested operation frequencies, the 3 dB gain bandwidth is from 54 GHz to 67.2 GHz (21.8%), and the 3 dB axial ratio is from 52.2 GHz to 74.3 GHZ (35%).

Figure 11A:
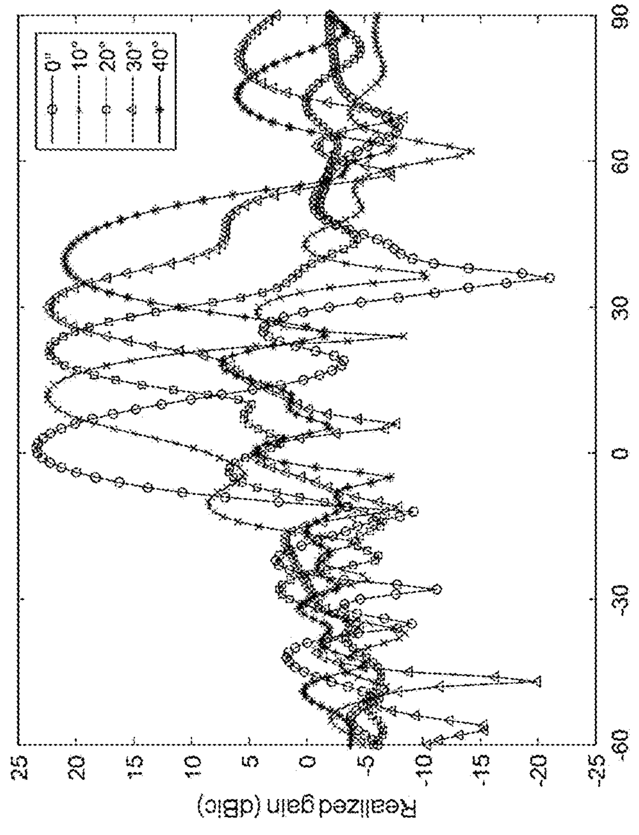
FIG. 11A is a plot showing simulated realized gain (xoz-plane scanning) of the antenna of FIG. 1B at different elevation angles in one embodiment of the invention.
Figure 11B:
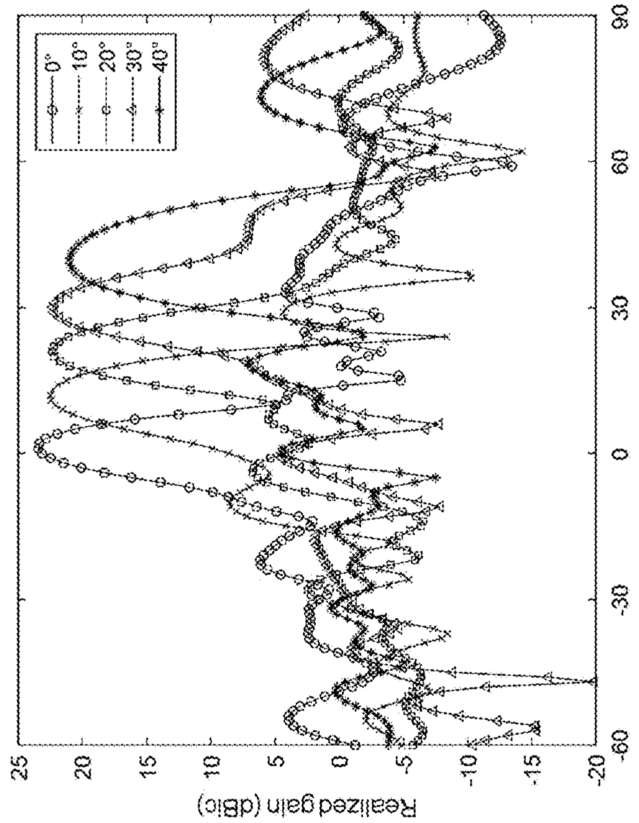
FIG. 11B is a plot showing simulated realized gain (yoz-plane scanning) of the antenna of FIG. 1B at different elevation angles in one embodiment of the invention.

In addition, five elevation angles from 0° to 40° are simulated with a step of 10° in xoz plane and yoz plane to demonstrate the 2D beam scanning ability of the antenna of the above embodiment. FIGS. 11A and 11B show the simulated realized gain for xoz-plane scanning and yoz-plane scanning respectively. As shown in FIGS. 11A and 11B, the simulated gains remain stable within 2.4 dB variation and the sidelobes are all less than −13.9 dB in the scanning range.

The beam angles and the orientations of the metasurface structures 102U, 102L in this example are listed in Table II.

TABLE II calculated metasurface structures rotation angles for the selected beam angles in one example

| θ (deg.) | φ (deg.) | $\alpha_1$ (deg.) | $\alpha_2$ (deg.) |
|---|---|---|---|
| 0 | 0 | 90 | −90 |
| 10 | 0 | 74.32 | −74.32 |
| 20 | 0 | 57.85 | −57.85 |
| 30 | 0 | 38.93 | −38.93 |
| 40 | 0 | 0 | 0 |
| 0 | 90 | 180 | 0 |
| 10 | 90 | 164.32 | 15.68 |
| 20 | 90 | 147.85 | 32.15 |
| 30 | 90 | 128.93 | 51.07 |
| 40 | 90 | 90 | 90 |

In the above example, one of the main functions of the antenna 100 is the mechanically steering of the generated high-gain beam. The off-axis high gain beam is generated on the upper aperture of the upper metasurface structure 102U by compensating for the spatial phase delay and introducing a phase gradient. The elevation angle of the beam can be tuned by controlling the relative (angular) orientations of upper and lower metasurface structures, while the azimuth angle is controlled by the summation of the rotation angles of the upper and lower metasurface structures. In the above example, the antenna 100 has a low profile, e.g., one-fourth thickness compared with a traditional transmit array antenna.

In the above example, the antenna 100 (metasurface system) is designed to operate at 60 GHz. However, the invention is not limited to operation in 60 GHz. The same principle can be used to design and create antenna 100 suitable for operation in other frequency or frequency band(s). As an alternative example, the antenna can be applied in a 28 GHz communication system. The mechanical beam steering ability of the antenna 100 makes it suitable for, e.g., confocal microscopes and radar systems.

The antenna in some embodiments of the invention have one or more of the following features or advantages. In some embodiments, the antenna can have a relatively low profile, which is beneficial to compact the antenna part in modern communication devices. In some embodiments, the antenna is integrated with beam scanning function. In analogy with the Risley prism, the mechanical beam scanning approach is compactness, relative insensitive to vibrations, and/or can be easily installed. The beam scanning ability can be particularly useful in various application such as imaging, Satcom on the move (SOTM), and radar systems. The antenna in some embodiments of the invention can be relatively easily fabricated based on standard PCB technology.

In some embodiments the antenna uses a folded reflectarray mechanism, which can significantly reduce the antenna profile and can trap the electromagnetic (EM) waves in the space or cavity defined by the metasurface structures. In some embodiments, the radiated high-gain beam is steerable by mechanically rotating the metasurface structures (in analogy with Risley prism). In some embodiments the antenna with an open-ended waveguide (OEWG) feed can achieve a ±40° beam steering range in a wide bandwidth.

Some embodiments of the invention can be used to compact the antenna part in mmWave communications and imaging systems. In some embodiments, an integrated circuit (IC) based oscillator, e.g., mmWave IC-based oscillator, can be used as the feed of the antenna of the folded reflectarray to reduce the antenna profile. The antenna in some embodiments can be produced, e.g., mass produced, as an antenna-in-package (AiP).

It will be appreciated by persons skilled in the art that variations and/or modifications may be made to the invention as shown in the specific embodiments to provide other embodiments of the invention. The described embodiments of the invention should therefore be considered in all respects as illustrative, not restrictive. Example optional features of some aspects of the invention are set forth in the above summary of the invention. Some embodiments of the invention may include one or more of these optional features (some of which are not specifically illustrated in the drawings). Some embodiments of the invention may lack one or more of these optional features (some of which are not specifically illustrated in the drawings). One or more features in one embodiment and one or more features in another embodiment may be combined to provide further embodiment(s) of the invention. For example, the antenna in some embodiments may additionally or alternatively operate in at least part of one or more other frequencies or frequency bands (not limited to the mm Wave band). For example, the metasurface structure assembly, e.g., the first and second metasurface structures, may be constructed differently from that illustrated in the example implementations. The antenna may lack a movement mechanism, or the movement mechanism may be deactivated, if beam steering function is not required. In some implementations, the antenna may be a transmit antenna arranged to operate in transmit mode. In some implementations, the antenna may be a transmit-receive antenna arranged to operate in transmit and receive modes (selectively). The numbers of conductive elements/patches of the first and second metasurface structures of the metasurface structure assembly may be different than illustrated.

The invention claimed is:

1. An antenna comprising:

a metasurface structure assembly; and a feed coupled with the metasurface structure assembly and operable to provide a first type of electromagnetic radiation with a first radiation property to the metasurface structure assembly;

wherein the metasurface structure assembly is operable to receive the first type of electromagnetic radiation from the feed and to convert the first type of electromagnetic radiation into a second type of electromagnetic radiation and then back to the first type of electromagnetic radiation with a second radiation property different from the first radiation property for radiation from the metasurface structure assembly.

2. The antenna of claim 1, wherein the first type of electromagnetic radiation comprises one of right-hand circularly polarized electromagnetic wave and left-hand circularly polarized electromagnetic wave; and wherein the second type of electromagnetic radiation comprises another one of right-hand circularly polarized electromagnetic wave and left-hand circularly polarized electromagnetic wave.

3. The antenna of claim 2, wherein the feed is integrated with the metasurface structure assembly.

4. The antenna of claim 1, wherein the metasurface structure assembly comprises:

a first metasurface structure having first and second sides; and a second metasurface structure having first and second sides, the first metasurface structure and the second metasurface structure are spaced apart such that at least part of the second side of the first metasurface structure is in facing relation with at least part of the first side of the second metasurface structure to define a space therebetween; and wherein the feed is coupled with the second metasurface structure.

5. The antenna of claim 4, wherein the feed is in facing relation with the second side of the first metasurface structure.

6. The antenna of claim 4, wherein the first metasurface structure comprises a receiver-transmitter metasurface structure.

7. The antenna of claim 4, wherein the second metasurface structure comprises a reflective metasurface structure.

8. The antenna of claim 4, wherein the feed is operable to transmit or radiate the first type of electromagnetic radiation with the first radiation property to the second side of the first metasurface structure;

wherein the first metasurface structure is operable to reflect the first type of electromagnetic radiation incident on its second side to the first side of second metasurface structure;

wherein the second metasurface structure is operable to convert the first type of electromagnetic radiation incident on its first side into the second type of electromagnetic radiation for reflection from its first side to the second side of the first metasurface structure; and wherein the first metasurface structure is further operable to receive the second type of electromagnetic radiation incident on its second side, and convert the second type of electromagnetic radiation into the first type of electromagnetic radiation with the second radiation property for radiation from its first side.

9. The antenna of claim 8, wherein the first metasurface structure is arranged to reflect the first type of electromagnetic radiation incident on its second side in such a way that an angle of reflection of the first type of electromagnetic radiation is different from an angle of incident of the first type of electromagnetic radiation.

10. The antenna of claim 9, wherein the first metasurface structure is arranged to reflect the first type of electromagnetic radiation incident on its second side in such a way that an angle of reflection of the first type of electromagnetic radiation is smaller than an angle of incident of the first type of electromagnetic radiation.

11. The antenna of claim 4, wherein the first metasurface structure comprises:

a substrate assembly with a first surface on the first side of the first metasurface structure and a second surface on the second side of the first metasurface structure;

a ground plane coupled with the substrate assembly; and a plurality of conductive elements coupled with the substrate assembly;

wherein each of the plurality of conductive elements respectively comprises:

a first conductive patch arranged on the first surface;

a second conductive patch arranged on the second surface; and a connector arranged in the substrate assembly and electrically connecting the first and second conductive patches.

12. The antenna of claim 11, wherein the plurality of conductive elements are arranged such that the first metasurface structure can provide multiple resonances.

13. The antenna of claim 11, wherein at least some of the first conductive patches of the plurality of conductive elements have different orientations; and/or wherein at least some of the second conductive patches of the plurality of conductive elements have different orientations.

14. The antenna of claim 11, wherein in plan view at least one of the first conductive patches has a generally E-shaped structure; and/or wherein in plan view at least one of the second conductive patches has a generally E-shaped structure.

15. The antenna of claim 14, wherein the generally E-shaped structure comprises:

a head portion, a first arm portion extending away from the head portion and elongating along a first direction, a second arm portion extending away from the head portion and elongating along the first direction, a third arm portion extending away from the head portion and elongating along the first direction, the second arm portion being arranged between the first and third arm portions, and a bridge portion spaced apart from the head portion and connecting the first arm portion with the second arm portion.

16. The antenna of claim 11, wherein the second metasurface structure comprises:

a substrate with a first surface on the first side of the second metasurface structure and a second surface on the second side of the second metasurface structure;

a ground plane coupled with the substrate; and a plurality of conductive patches arranged on the first surface of the substrate.

17. The antenna of claim 16, wherein in plan view at least one of the conductive patches has a generally maltese-cross-shaped structure.

18. The antenna of claim 4, wherein at least part of the feed is arranged in or on the second metasurface structure.

19. The antenna of claim 4, further comprising a movement mechanism arranged to move at least one of the first metasurface structure and the second metasurface structure for beam steering.

20. The antenna of claim 19, wherein the movement mechanism comprises a rotation mechanism arranged to rotate at least one of the first metasurface structure and the second metasurface structure.

21. The antenna of claim 20, wherein the rotation mechanism is operable to cause relative rotation between the first metasurface structure and the second metasurface structure.

22. The antenna of claim 1, wherein the feed comprises a waveguide or an integrated circuit (IC) oscillator.

23. The antenna of claim 1, wherein the antenna is arranged for operation at a mmWave frequency or at least part of mmWave frequency band.

24. The antenna of claim 1, wherein the first radiation property comprises a first radiation pattern and/or a first gain, the second radiation property comprises a second radiation pattern and/or a second gain.

25. The antenna of claim 24, wherein the first radiation property is less directional than the second radiation pattern; and/or wherein the second gain is larger than a first gain.

26. The antenna of claim 1, wherein the metasurface structure assembly includes a metasurface structure comprising:

a substrate assembly with a first surface and a second surface opposite the first surface;

a ground plane coupled with the substrate assembly; and a plurality of conductive elements coupled with the substrate assembly;

wherein each of the plurality of conductive elements respectively comprises:

a first conductive patch arranged on the first surface;

a second conductive patch arranged on the second surface; and a connector arranged in the substrate assembly and electrically connecting the first and second conductive patches.

27. The metasurface structure of claim 26, wherein in plan view at least one of the first conductive patches has a generally E-shaped structure; and/or wherein in plan view at least one of the second conductive patches has a generally E-shaped structure.

28. The metasurface structure of claim 27, wherein the generally E-shaped structure comprises:

a head portion, a first arm portion extending away from the head portion and elongating along a first direction, a second arm portion extending away from the head portion and elongating along the first direction, a third arm portion extending away from the head portion and elongating along the first direction, the second arm portion being arranged between the first and third arm portions, and a bridge portion spaced apart from the head portion and connecting the first arm portion with the second arm portion.

29. The antenna of claim 1, wherein the metasurface structure assembly includes a metasurface structure comprising:

a substrate with a first surface and a second surface opposite the first surface;

a ground plane coupled with the substrate; and a plurality of conductive patches arranged on the first surface of the substrate.

30. The metasurface structure of claim 29, wherein in plan view at least one of the conductive patches has a generally maltese-cross-shaped structure.

* * * * *